(12) United States Patent
Furuki et al.

(10) Patent No.: US 7,974,173 B2
(45) Date of Patent: Jul. 5, 2011

(54) OPTICAL DEVICE FOR HOLOGRAPHIC RECORDING OR READING AND METHOD FOR CONTROLLING THE SAME

(75) Inventors: Makoto Furuki, Kanagawa (JP); Katsunori Kawano, Kanagawa (JP); Jiro Minabe, Kanagawa (JP); Yasuhiro Ogasawara, Kanagawa (JP); Shin Yasuda, Kanagawa (JP); Koichi Haga, Kanagawa (JP); Kazuhiro Hayashi, Kanagawa (JP); Hisae Yoshizawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 596 days.

(21) Appl. No.: 12/013,506

(22) Filed: Jan. 14, 2008

(65) Prior Publication Data
US 2008/0267038 A1 Oct. 30, 2008

(30) Foreign Application Priority Data

Apr. 27, 2007 (JP) ................................ 2007-119136

(51) Int. Cl.
*G11B 7/135* (2006.01)
(52) U.S. Cl. ......... 369/112.09; 369/112.14; 369/112.21; 369/112.28
(58) Field of Classification Search .................... None
See application file for complete search history.

(56) References Cited

U.S. PATENT DOCUMENTS

| | | | |
|---|---|---|---|
| 2002/0172135 A1* | 11/2002 | Manavi | 369/112.28 |
| 2004/0022141 A1* | 2/2004 | Nakamura et al. | 369/44.12 |
| 2005/0232116 A1* | 10/2005 | Misawa et al. | 369/103 |
| 2006/0140101 A1* | 6/2006 | Tsukagoshi et al. | 369/103 |
| 2006/0262701 A1* | 11/2006 | Okada et al. | 369/103 |
| 2007/0091768 A1* | 4/2007 | Hori et al. | 369/103 |
| 2007/0153663 A1* | 7/2007 | Fukumoto et al. | 369/103 |

FOREIGN PATENT DOCUMENTS

JP 2003-178458 A 6/2003

* cited by examiner

*Primary Examiner* — Hoa T Nguyen
*Assistant Examiner* — Emily Frank
(74) *Attorney, Agent, or Firm* — Sughrue Mion, PLLC

(57) ABSTRACT

An optical device for holographic recording or reading is provided and includes: a light emission unit that emits light to be irradiated on an optical recording medium, the light being recording or reading light; a first prism unit that moves in accordance with a moving speed of the optical recording medium and refracts the light to move the light irradiated on the optical recording medium over a distance in a moving direction of the optical recording medium so that the light is irradiated on substantially the same position on the optical recording medium for a period of time; and a second prism unit that moves in accordance with the moving speed of the first prism unit to compensate for an optical path length of the light.

12 Claims, 5 Drawing Sheets

OPTICAL DEVICE FOR HOLOGRAPHIC RECORDING OR READING AND METHOD FOR CONTROLLING THE SAME

CROSS-REFERENCE TO RELATED APPLICATION

This application is based on and claims priority under 35 USC §119 from Japanese Patent Application No. 2007-119136 filed Apr. 27, 2007.

BACKGROUND (i) Technical Field

The present invention relates to an optical device for holographic recording or reading and a method for controlling the same.

(ii) Related Art

A holographic recording and reading method is a method for recording or reading digital data by means of recording or reading, as a hologram, signal light in which binary digital data "0 and 1" are digitally imaged as "bright and dark", for example. In this case, the signal light is subjected to Fourier transform by means of a lens, and a Fourier-transformed image is irradiated on an optical recording medium. Simultaneously, reference light which interferes with the signal light to generate interference fringes is also irradiated on the optical recording medium.

In such a holographic recording-and-reproduction method, an inexpensive semiconductor laser is often used as a source of recording light or reproduction light. Since output light of the semiconductor laser is weak, the recording light or reproduction light must be irradiated on the same position on an optical recording medium for a given period of time in order to enhance the accuracy of recording or reading operation.

SUMMARY

According to an aspect of the invention, there is provided an optical device for holographic recording or reading, comprising:

a light emission unit that emits light to be irradiated on an optical recording medium, the light being recording or reading light;

a first prism unit that moves in accordance with a moving speed of the optical recording medium and refracts the light to move the light irradiated on the optical recording medium over a distance in a moving direction of the optical recording medium so that the light is irradiated on substantially the same position on the optical recording medium for a period of time; and a second prism unit that moves in accordance with the moving speed of the first prism unit to compensate for an optical path length of the light.

BRIEF DESCRIPTION OF THE DRAWINGS

Embodiments of the present invention will be described in detail based on the following figures, wherein.

DETAILED DESCRIPTION

Exemplary embodiments of the present invention will be described below with reference to the accompanying drawings.

Figure 1:
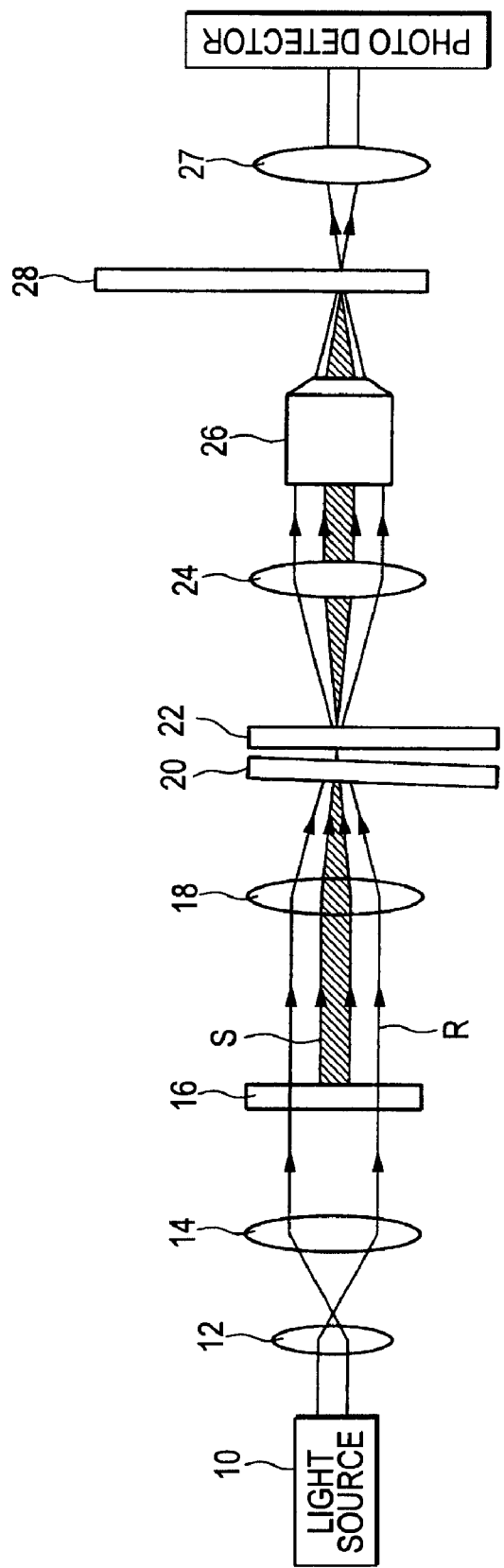
FIG. 1 is a view showing a configuration of an optical device for holographic recording or reading according to an exemplary embodiment of the present invention.

FIG. 1 shows a configuration of a holographic recording or reading optical device according an exemplary embodiment to the present invention. In FIG. 1, when signal light is recorded as a hologram, coherent light from a light source 10 is converted into collimated light of a large diameter through lenses 12, 14, and the collimated light enters into a spatial light modulator 16.

The spatial light modulator 16 includes, for example, a liquid-crystal panel, and produces a digital image (a binary image, but the present invention is not limited thereto), in which binary digital data "0, 1" are taken as "bright, dark", by means of a computer (not illustrated). As a result, the intensity of the light passed through the spatial light modulator 16 is modulated according to values of respective pixels of the binary image, to thus become signal light S. The signal light S passes through a prism unit 20 for compensation (compensation prism unit) and a prism unit 22 for moving an irradiation position (irradiation position-movement prism unit) and enters into a Fourier transform lens 26 through a relay lens 24. The signal light S is subjected to Fourier transform by means of the Fourier transform lens 26 and irradiated on an optical recording medium 28.

The irradiation position-movement prism unit 22 is provided for periodically moving recording light or reproduction light (signal light S or reference light R) to be irradiated on the optical recording medium 28, over a distance in the direction of movement of the optical recording medium 28 which is rotating, so that the recording light or reproduction light is irradiated on substantially the same position on the optical recording medium 28 for a period of time. The compensation prism unit 20 is provided for compensating for an optical path length of the recording light or reproduction light passing through the irradiation position-movement prism unit 22 in such a way a focal position is fixed in a thicknesswise direction of the optical recording medium. The compensation prism unit 20 and the irradiation position movement prism unit 22 will be described later.

The reference light R shares an optical axis with the signal light S and is irradiated on the optical recording medium 28 from the outside of the signal light S. The coherent light from the light source 10 is converted into collimated light through the lenses 12 and 14, and the collimated light enters, as the reference light R, into an outer peripheral region of the spatial light modulator 16. The reference light R passed through the outer peripheral region of the spatial light modulator 16 is irradiated on the optical recording medium 28 through the relay lens 18, the compensation prism unit 20, the irradiation position-movement prism unit 22, the relay lens 24, and the Fourier transform lens 26.

Through the foregoing processes, the signal light S and the reference light R, which have been subjected to Fourier transform, interfere with each other in the optical recording medium, and the signal light S is recorded as a hologram in the optical recording medium 28.

The spatial light modulator 16 is described as a transmission type but can also be embodied as a reflection type. The reference light R may not share the optical axis with the signal light S. In that case, the reference light R passes through another optical path differing from the optical path for the signal light S by means of an appropriate beam splitter and an appropriate reflection mirror, and the compensation prism unit 20 and the irradiation position-movement prism unit 22 are placed in the optical path of the reference light R.

In FIG. 1, when information is read from diffracted light of the hologram, coherent light from the light source 10 is converted into only the reference light R by means of the spatial light modulator 16, and the reference light R passes through the compensation prism unit 20 and the irradiation position-movement prism unit 22 through the relay lens 18, to thus enter the Fourier transform lens 26 through the relay lens 24. The reference light R is irradiated on the optical recording medium 28 through the Fourier transform lens 26, and thus-generated light which is diffracted from the hologram is converted into collimated light through an inverse Fourier transform lens 26. The collimated light is received by an appropriate photosensor, thereby acquiring information included in the hologram.

Figure 2:
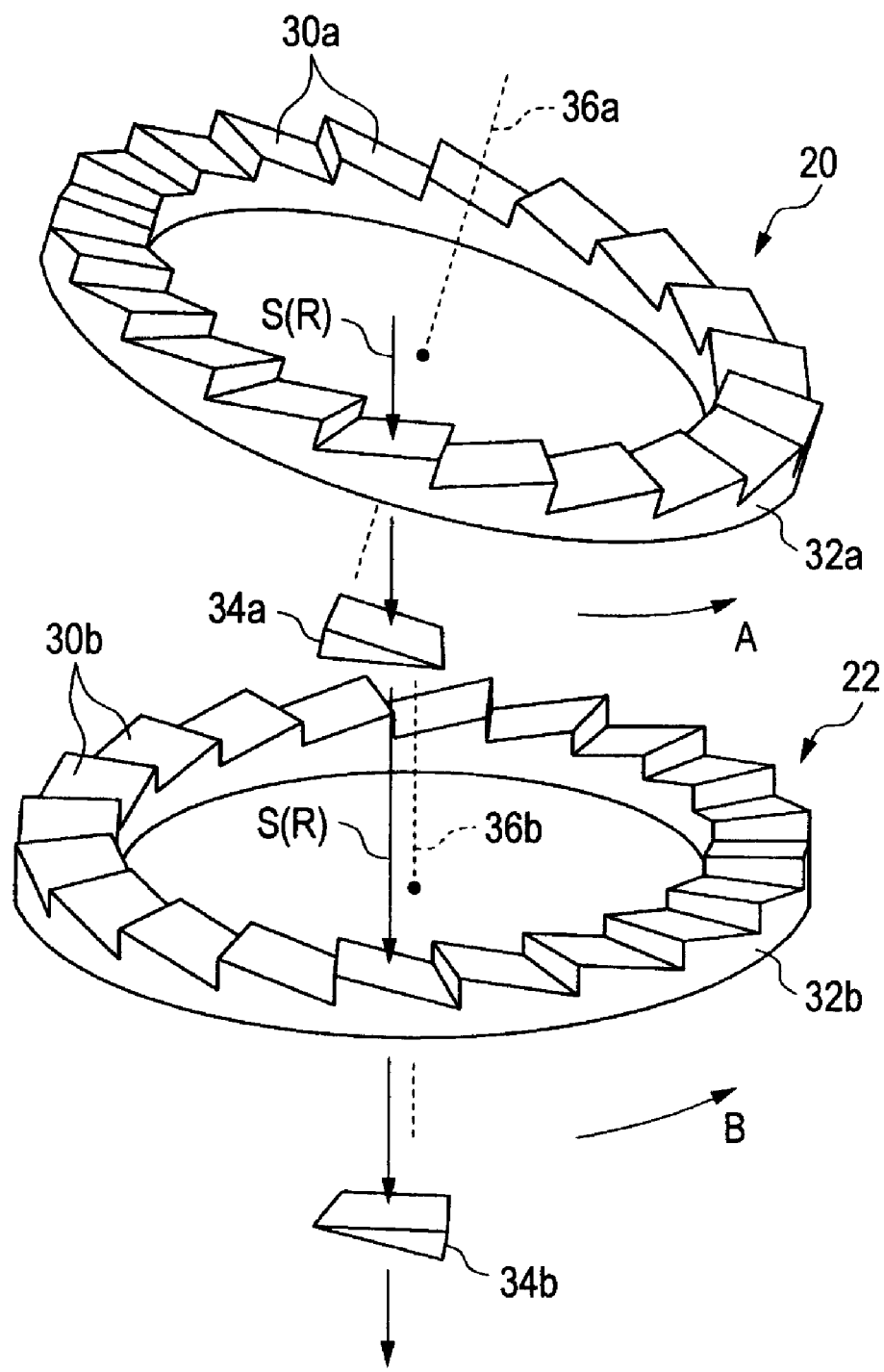
FIG. 2 is a view showing a configuration of a compensation prism unit and an irradiation position-movement prism unit.

FIG. 2 shows a configuration of the compensation prism unit 20 and the irradiation position-movement prism unit 22. In FIG. 2, the compensation prism unit 20 includes a fixed prism 34a and a disk 32a having a given number of rotary prisms 30a along a periphery of the disk 32a. Moreover, the irradiation position-movement prism unit 22 includes a fixed prism 34b and a disk 32b having a given number of rotary prisms 30b along a periphery of the disk 32b. The compensation prism unit 20 and the irradiation position-movement prism unit 22 are arranged in such a way that a rotation axis 36a of the compensation prism unit 20 forms an angle with a rotation axis 36b of the irradiation position-movement unit 22. In the embodiment shown in FIG. 2, the disk 32a forming the compensation prism unit 20 and the disk 32b forming the irradiation position-movement prism unit 22 are configured so as to be rotated around the respective rotation axes 36a and 36b in direction of arrow A and direction of arrow B (in the same direction when viewed in a light-incident direction) by an unillustrated appropriate rotation controller and an unillustrated appropriate motor.

In the compensation prism unit 20, light (the signal light S or the reference light R) enters into an incident plane of the rotary prism 30a at right angle and passes through the fixed prism 34a to enter into the irradiation position-movement prism unit 22. In the irradiation position-movement prism unit 22, the light enters into the rotary prism 30b and passes through the fixed prism 34b to exit toward the optical recording medium 28. In FIG. 2, after passing the compensation prism unit 20, light passes through the irradiation position-movement prism unit 22. However, the present invention is not limited to this sequence, and the sequence may also be inverted.

Figure 3:
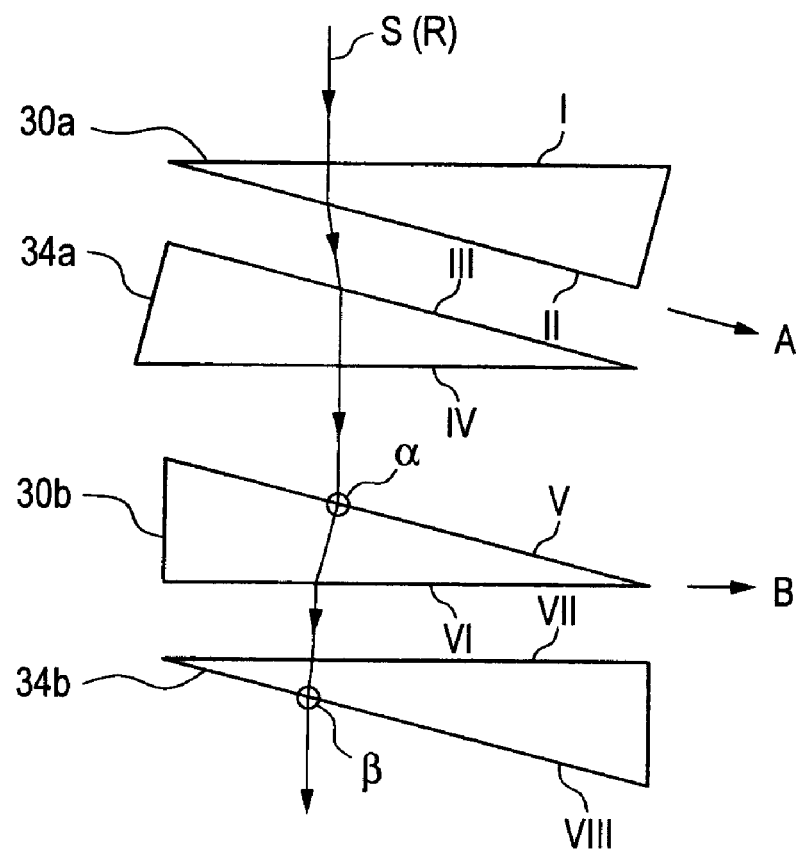
FIG. 3 is a descriptive view of an optical path along which light travels.

FIG. 3 shows a descriptive view of the optical path through which light travels. In FIG. 3, after entering into an incident plane I of the rotary prism 30a, the light through the fixed prism 34a to enter into an oblique surface V of the rotary prism 30b. After entering into the oblique surface V of the rotary prism 30b, the light enters into the fixed prism 34b. At this time, the light exits an exit plane VIII of the fixed prism 34b at an exit position β displaced leftwardly from an entrance position α on the oblique surface V of the rotary prism 30b. A difference between the entrance position α and the exit position β is dependent on the thickness of the rotary prism 30b. In conjunction with rotation of the disk 32b constituting the irradiation position-movement prism unit 22, the rotary prism 30b also moves in the direction of arrow B in FIG. 3, and hence the exit position β moves leftwardly in the drawing in conjunction with movement of the rotary prism 30b. As a result, the direction of light entering into the relay lens 24 shown in FIG. 1 is changed, and the position of the light entering into the optical recording medium 28 through the Fourier transform lens 26 is also moved. The direction of movement of the entrance position (an incident position of light on the optical recording medium) can coincide with the direction of movement of the optical recording medium 28 by means of setting the direction of rotational movement of the rotary prism 30b and the layout between the rotary prism 30b and the fixed prism 34b.

The irradiation position-movement prism unit 22 is provided with the plurality of rotary prisms 30b and rotates in the direction of arrow B in FIG. 2. Accordingly, the position of the light entering into the optical recording medium 28 is periodically moved for each of the rotary prisms 30b. So long as the moving speed of the rotary prisms 30b is set in accordance with the rotating speed of the optical recording medium 28, substantially the same position on the optical recording medium 28 can be irradiated with the light for a given period of time by means of periodic movement of the incident position of the light.

The optical path length of the light passing through the rotary prisms 30b and the fixed prism 34b is changed in conjunction with movement of the rotary prisms 30b in the direction of arrow B. Thereby, the focal position of the Fourier transform lens 26 is also displaced in the traveling direction of the light, and hence forming a hologram in the optical recording medium 28 may become difficult. Accordingly, the optical path length is corrected by the rotary prisms 30a and the fixed prism 34a serving as the compensation prism unit 20 in such a way that the focal point is not deflected in the thicknesswise direction of the medium. Specifically, the incident planes of the rotary prisms 20a and the incident planes of the rotary prisms 20b, where light enters, are arranged so as to spatially overlap each other in the traveling direction of light, and the disk 32a and the disk 32b are rotated at the same speed. At this time, as shown in FIG. 3, the thickness of the rotary prism 30a through which light passes becomes smaller in conjunction with movement of the rotary prism 30a in the direction of arrow A, and the thickness of the rotary prism 30b through which light passes becomes greater in conjunction with movement of the rotary prism 30b in the direction of arrow B. As a result, the optical path length of light passing through the rotary prisms 30a, the fixed prism 34a, the rotary prisms 30b, and the fixed prism 34b can be made constant at all times. Therefore, position displacement of the focal point of the Fourier transform lens 26 can be avoided.

The compensation prism unit 20 is configured in such a way that the incident plane I of the rotary prism 30a and the exit plane IV of the fixed prism 34a become parallel to each other. Since light is arranged so as to enter into the incident plane I of the rotary prism 30a at right angle, the light incident on the rotary prism 30a and the light exiting from the fixed prism 34a become parallel to each other. Further, the compensation prism unit 20 is also configured in such a way that the incident plane II of the rotary prism 30a and the exit plane III of the fixed prism 34a become parallel to the direction A of movement of the rotary prism 30a. Thereby, even when the rotary prisms 30a moves in the direction of arrow A, light enters into a constant position on the incident plane III of the fixed prism 34a. Accordingly, the light exits from a constant position on the exit plane IV of the fixed prism 34a, and an optical path length of light passing through the rotary prism 30a and the fixed prism 34a is determined by only the position of the rotary prism 30a where light enters. Therefore, a change in the optical path length due to movement of the rotary prisms 30b of the irradiation position-movement prism unit 22 can be readily corrected by controlling only the moving speed of the rotary prisms 30a.

Figure 4:
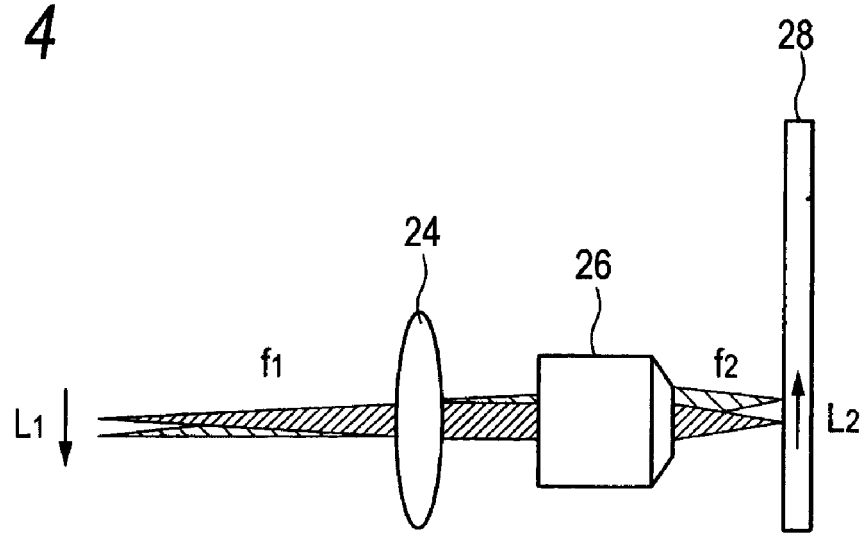
FIG. 4 is a descriptive view of the principle of movement of a light-incident position on an optical recording medium by the irradiation position-movement prism unit.

FIG. 4 shows a descriptive view of the principle of the light-incident position on the optical recording medium 28 being moved by the irradiation position-movement prism unit 22. In FIG. 4, light focused by the relay lens 18 shown in FIG. 1 at a position in front of the relay lens 24 is collimated by the relay lens 24, and the thus-collimated light is focused on the optical recording medium 28 through the Fourier transform lens 26. In general, when the collimated light enters the Fourier transform lens 26, the incident position of light on the optical recording medium 28 is not moved even when the collimated light is parallel-shifted in a direction perpendicular to the optical axis, the light-incident position on the optical recording medium 28 is not moved. However, when the focal point focused in front of the relay lens 24 is moved in the direction perpendicular to the optical axis, the light-incident position on the optical recording medium 28 is also moved.

In FIG. 4, when the position of the focal point (the focus made by the relay lens 18 shown in FIG. 1) in front of the relay lens 24 is displaced over merely a distance $L_1$ by means of the rotary prism 30b and the fixed prism 34b serving as the irradiation position-movement prism unit 22, the light-incident position on the optical recording medium 28 is displaced by $L_2$. At this time, provided that the focal length of the relay lens 24 is taken as $f_1$ and that the focal length of the Fourier transform lens 26 is taken as $f_2$, a relationship of $f_1/f_2=L_1/L_2$ stands. Accordingly, the amount of displacement of the light-incident position on the optical recording medium 28 can be set according to the equation.

Figure 5:
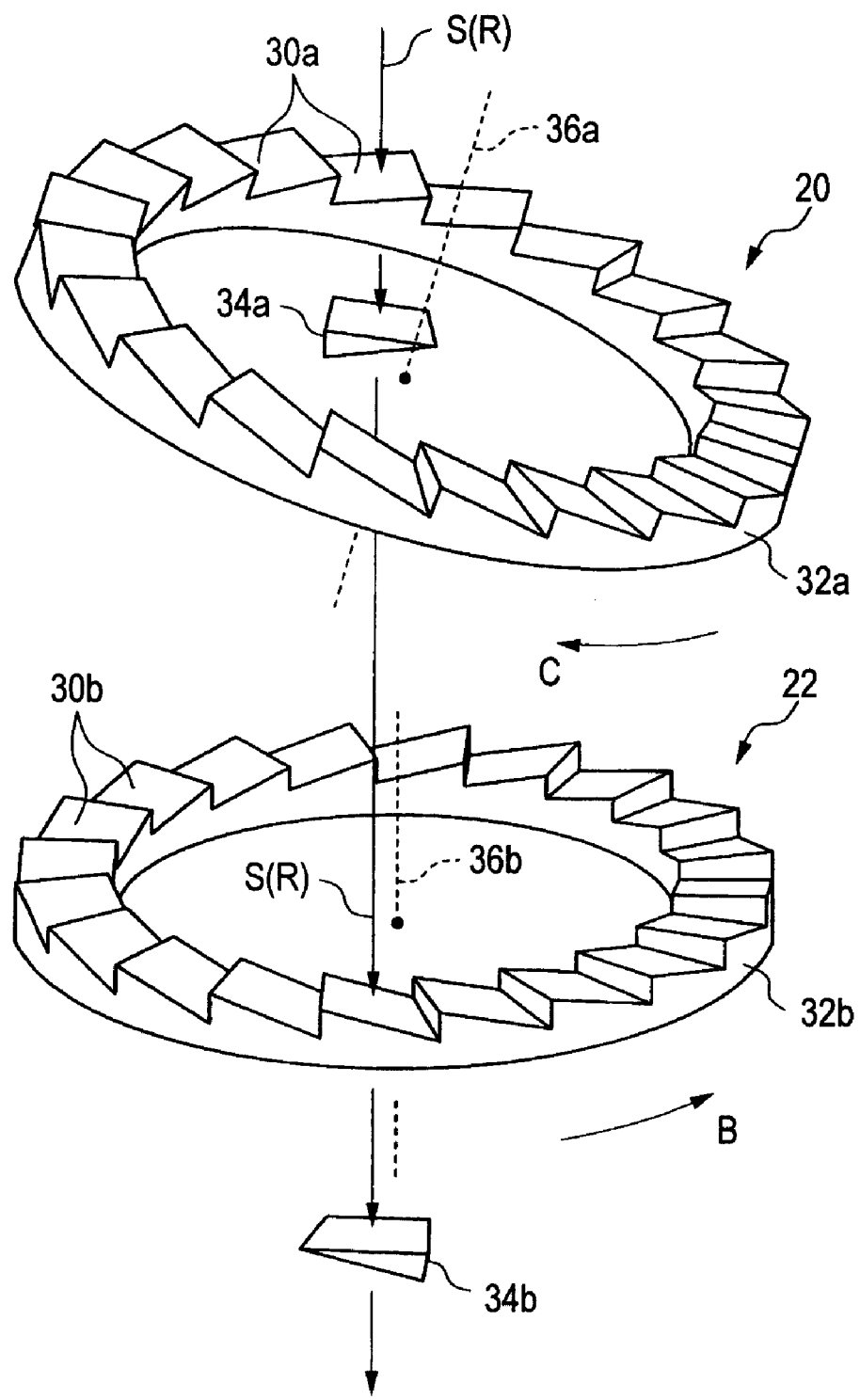
FIG. 5 is a view showing another configuration of a compensation prism unit and an irradiation position-movement prism unit.

FIG. 5 shows another configuration of the compensation prism unit 20 and the irradiation position-movement prism unit 22. In FIG. 5, the oblique surfaces of the respective rotary prisms 30a formed on the compensation prism unit 20 are opposite in direction to the oblique surfaces shown in FIG. 2. The disk 32a and the disk 32b are arranged so as to become offset from each other in a direction interconnecting the rotation centers of the disks, as shown in FIG. 6B. Moreover, as indicated by an arrow C, the rotating direction of the disk 32a is opposite to the rotating direction of the same shown in FIG. 2. Therefore, in the embodiment shown in FIG. 5, the disk 32a and the disk 32b rotate in opposite directions (when viewed in a light-incident direction). In such a configuration, the position of light entering the optical recording medium 28 can be moved by the principle shown in FIG. 3.

Figure 6A:
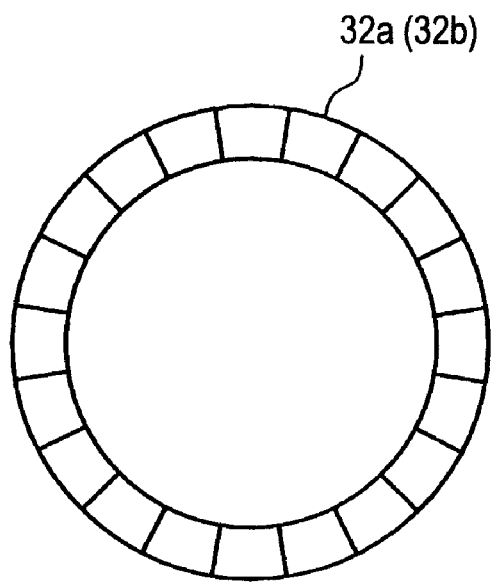
FIG. 6 is a view showing an arrangement of disks constituting a compensation prism unit and an irradiation position-movement prism unit.
Figure 6B:
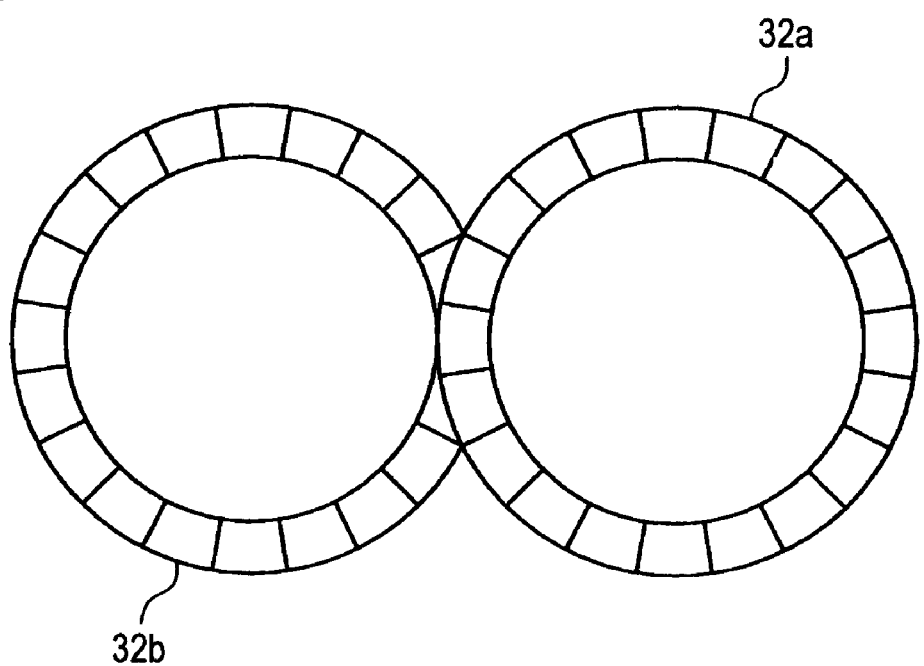

FIGS. 6A and 6B show an arrangement of the disk 32a and disk 32b constituting the compensation prism unit 20 and the irradiation position-movement prism unit 22 shown in FIGS. 2 and 6. FIG. 6A shows an arrangement of FIG. 2, in which the disk 32a and the disk 32b spatially overlap each other with respect to the vertical direction (i.e., the incident direction of light).

In contrast, FIG. 6B shows an arrangement of FIG. 5, in which the disk 32a and the disk 32b are offset from each other with respect to the direction of the line interconnecting the rotation centers of the disks 32a and 32b. Therefore, of the rotary prisms 30a and 30b, only a prism into which light enters and prisms adjacent thereto spatially overlap each other.

The disk 32a and the disk 32b, which are shown in FIG. 2, may also be arranged as shown in FIG. 6B and rotated in a single direction (the direction of arrows A and B). Alternatively, the disk 32a and the disk 32b, which are shown in FIG. 5, may also be arranged as shown in FIG. 6A and rotated in an opposite direction (the direction of arrows B and C).

What is claimed is:

1. An optical device for holographic recording or reading, comprising:
    a light emission unit that emits light to be irradiated on an optical recording medium, the light being recording or reading light;
    a first prism unit that moves in accordance with a moving speed of the optical recording medium and refracts the light to move the light irradiated on the optical recording medium over a distance in a moving direction of the optical recording medium so that the light is moved in accordance with the moving speed of the optical recording medium to be irradiated on substantially the same position on the optical recording medium for a period of time; and
    a second prism unit that moves in accordance with a moving speed of the first prism unit to compensate for an optical path length of the light.

2. The optical device according to claim 1, wherein the first prism unit moves a focal point in a horizontal direction parallel to a surface of the optical recording medium, the focal point being formed by a lens before the light enters into another lens for irradiating the light on the optical recording medium.

3. The optical device according to claim 1, wherein the first prism unit periodically moves the light irradiated on the optical recording medium, in a horizontal direction parallel to a surface of the optical recording medium.

4. The optical device according to claim 1, wherein each of the first prism unit and the second prism unit includes a disk having prisms disposed along a periphery of the disk, and the disk of the first prism unit has a rotation axis forming an angle with a rotation axis of the disk of the second prism unit.

5. The optical device according to claim 4, wherein the light vertically enters into an incident plane of a prism in the disk of the first prism unit.

6. The optical device according to claim 4, wherein each of the first prism unit and the second prism unit further includes a fixed prism.

7. The optical device according to claim 4, wherein disks of the first and the second prism units rotate in the same direction when viewed in a direction perpendicular to a surface of the optical recording medium.

8. The optical device according to claim 4, wherein the rotation axis of the disk of the first prism unit is non-coaxial with the rotation axis of the disk of the second prism unit.

9. The optical device according to claim 1, wherein the second prism unit is configured to compensate for a displacement in focal position in a traveling direction of the light, the displacement resulting from the refraction by the first prism unit.

10. The optical device according to claim 9, wherein the first prism unit and the second prism unit are configured such that an optical path length of light passing through the first prism unit and the second prism unit is constant at all times during the movement of the first prism unit and the second prism unit.

11. The optical device according to claim 4, wherein the disks of the first and second prism units rotate in opposite directions to each other when viewed in a direction perpendicular to a surface of the optical recording medium.

12. A method for controlling an optical device for holographic recording or reading, the method comprising:

emitting light to be radiated on an optical recording medium, the light being recording or reading light;

refracting the light to move the light irradiated on the optical recording medium over a distance in a moving direction of the optical recording medium so that the light is moved in accordance with a moving speed of the optical recording medium to be irradiated on substantially the same position on the optical recording medium for a period of time; and compensating for an optical path length of the light, wherein the refracting the light to move the light irradiated on the optical recording medium comprises moving a first prism unit in accordance with the moving speed of the optical recording medium, and wherein the compensating for the optical path length of the light comprises moving a second prism unit in accordance with the moving speed of the first prism unit.

* * * * *